UNITED STATES PATENT OFFICE.

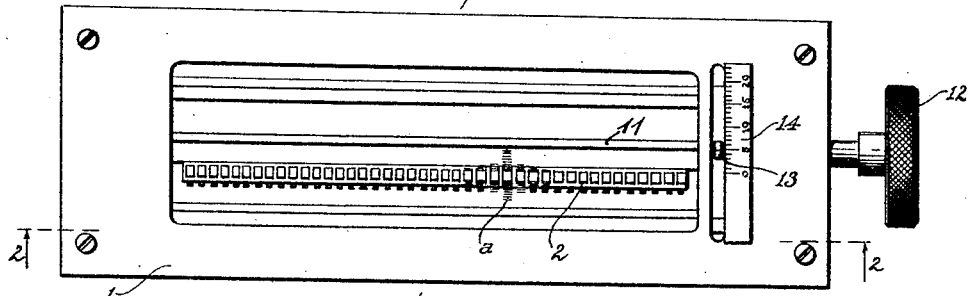
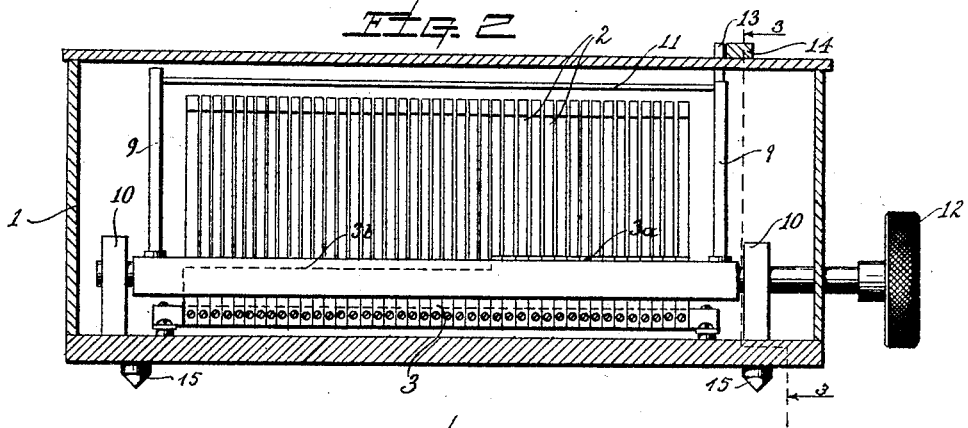
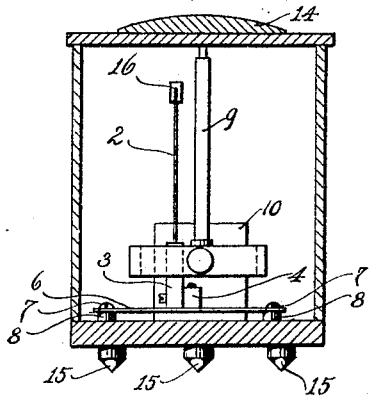

KARL GEORG FRANK, OF WYOMING, NEW JERSEY.

VIBRATING REED INSTRUMENT.

1,416,550.           Specification of Letters Patent.       Patented May 16, 1922.

Application filed September 4, 1919. Serial No. 321,713.

*To all whom it may concern:*

Be it known that I, KARL GEORG FRANK, a citizen of the United States, and residing in the town of Wyoming, county of Union, and State of New Jersey, have invented certain new and useful Improvements in Vibrating Reed Instruments, of which the following is a full specification.

The particular novel features of my invention are pointed out more fully in the annexed claims and my invention is illustrated in the accompanying drawings in which, Figure 1 is a plan view of the instrument;

Figure 2 a side elevation partly in section on the line 2—2 in Figure 1 and,

Figure 3 a transverse section on the line 3—3 in Figure 2.

Vibrating reed instruments have heretofore been used chiefly for determining and indicating the number of revolutions of machines of any kind as well as indicatng the number of cycles of alternating currents.

Recently, more frequent use is being made of these instruments for indicating the amplitude and character of vibrations of rotating or oscillating bodies. For instance, such instruments may be used to great advantage for determining the vibration frequency and its amplitude of a machine under various conditions of adjustment—as of balance; or under various conditions of operation; or under ordinary conditions of "wear and tear"; or of two or more machines; or for determining the vibrations and their amplitude of surrounding structures and buildings.

In order to secure more perfect and reliable operation of these instruments as well as to facilitate the readings of amplitudes of vibrations, I have made certain improvements which I shall now describe. Referring to Figures 1 and 2, 1 represents the casing which contains the group of reeds which indicate the vibrations between certain minimum and maximum limits. The reeds 2 are all mounted on a common reed bar 3 which is attached to a supporting bar 4 running longitudinal of the casing and being substantially located in parallel and closely adjacent to the bed plate 5 of the instrument. The bar 4 is mounted at both ends on leaf springs 6 which in turn are secured at their ends to the bed plate 5, for instance by screws 7 as shown. These springs are slightly elevated above the bed plate by small blocks 8 so that a flexible coupling is established between the reed bar 3 and the bed plate. Reeds 2 are rigidly secured in reed bar 3 which may vary in height such as is shown at $3^a$, $3^b$ (Figure 2) in order to increase the range over which the vibrations are indicated. In other words, to the higher portion $3^a$ of the bar, the shorter reeds indicating the higher range of vibrations are attached, while to the lower portion of the bar, the longer reeds indicating the lower range of vibrations are attached, it being assumed that the free ends of the reeds are all in horizontal alignment (Figure 2). This construction of vibrating reed instruments is old in the art. In order to determine the amplitude of the vibrations, I have mounted in casing 1, a bail 9 which swings in bearing blocks 10 so that its cross bar 11 passes over the group of reeds when the bail is operated by means of knob 12 protruding through the end wall of the casing. One end of the bail is provided with a detent 13 which passes along a scale 14 mounted transversely on top of the casing (see Figures 1, 2 and 3). When it is desired to measure the amplitude of vibrations of a certain reed, for instance $a$ Figure 1, the operator adjusts bail bar 11 by means of knob 12 so that his line of vision passes over the edge of the bar and through the end of the elongated image $a$ of the reed whose vibrations he observes. He then is enabled to read on the scale the extent of the vibrations which may be in angular degrees or in any desirable units.

Now, it is very essential that in using such a reed instrument, the coupling between the base plate of the instrument and the machine or surface to be tested for vibrations shall be well defined and rigid, otherwise the amplitude of vibrations of the instrument will not be proportional to the amplitude of vibrations of the body to be investigated, but a more complicated mathematical function will result which is hard to determine by the simple reading of amplitudes above described. In order to obtain this rigid coupling, I equip the bottom of base plate 5 with three hardened steel points 15, so that by pressing the instrument even slightly on to the surface to be investigated, a well determined, rigid coupling is effected and accuracy and proportionality of the instrument indications to the actual vibrations is obtained.

Where magnetic surfaces are to be tested, it is preferable to make the base plate 5 of iron so that the magnetic attraction will increase the rigid coupling between the instrument and the surface.

The reeds of these instruments usually consist of thin strips of spring steel secured at one end to the reed bar by soldering or the like and having their free ends bent over at right angles in order to form a smooth upper surface, usually covered with white lacquer so as to make the vibrations better visible. In order to tune individual reeds to different frequencies within the range for which the instrument is designed, it was heretofore customary to place a drop of tin underneath the bent-over portion, the amount of tin varying with the frequency for which the individual reeds are designed. This method has several disadvantages. In the first place, the bending over of the steel strips can only be done by annealing the upper part of the reed, which is difficult to do without impairing the flexibility of the springs. Moreover, the placing of a drop of tin into the angle thus formed is tedious work, in so far as the amount of tin necessary for a special reed is hard to gage, so that it later on becomes necessary to file down the tin in order to obtain the desired weight required for the reed responding to a particular frequency. In order to overcome these difficulties, I use small brass weights 16 which are placed as riders on the free ends of the reeds and secured in any suitable manner, for instance by soldering or the like to the springs. In order to obtain response of the individual reeds to different frequencies, the brass weights are made of different lengths, the longer weights being used for the lower frequencies and the gradually shorter weights being used for the higher frequencies. The upper surfaces of the weights are all of the same width sufficient to provide a surface which can be covered with white lacquer and which is plainly visible to the eye. By using such brass weights, it is no more necessary to bend and anneal the springs and a much greater variety of weights can be held in stock in larger quantities and their size can be determined with great accuracy, so that the manufacturing costs are greatly reduced over the old methods described hereinbefore. I have found in particular that the reeds provided with such brass weights can be made to respond more accurately to certain frequencies for which they are designed than reeds manufactured by the method pointed out above. This is of special importance when it becomes necessary to adjust the reeds for small intervals of frequencies.

In order to avoid corrosion at places where soldering operations are necessary on the reeds, I prefer to copperplate the entire finished reed and weight. By this expedient the constancy of the instrument indications is considerably increased, since the slightest corrosion will affect the weight of the reed and thus its vibration periodicity.

I claim:

1. In a vibrating reed instrument of the character described, the combination with a group of reeds, arranged side by side and in alignment with each other, and a bail pivoted substantially in line with the foot of the reeds and adapted to swing over their free ends, means for adjusting the angular position of said bail to ascertain the amplitude of an oscillating reed, and a scale divided into suitable units and located adjacent to one end of the bail for reading the value of said amplitude.

2. In a vibrating reed instrument of the character described, the combination with a group of reeds, arranged side by side and in alinement with each other, and an observation bar disposed to move over the free ends of said reeds transversely to the direction of their alinement and means for adjusting said bar to ascertain the amplitude of an oscillating reed, and a scale divided into suitable units and located adjacent to one end of the bail for reading the value of said amplitude.

KARL GEORG FRANK.